(No Model.)

G. W. STEPHENS.
COMBINED MOLE AND RAT TRAP.

No. 551,412. Patented Dec. 17, 1895.

WITNESSES:
M. D. Bloudel
H. B. Brown

INVENTOR
George W. Stephens.
BY Wm B. Matthews
ATTORNEY.

UNITED STATES PATENT OFFICE.

GEORGE WASHINGTON STEPHENS, OF ALMOND, ALABAMA.

COMBINED MOLE AND RAT TRAP.

SPECIFICATION forming part of Letters Patent No. 551,412, dated December 17, 1895.

Application filed December 18, 1894. Serial No. 532,169. (No model.)

*To all whom it may concern:*

Be it known that I, GEORGE WASHINGTON STEPHENS, a citizen of the United States, residing at Almond, in the county of Randolph and State of Alabama, have invented certain new and useful Improvements in a Combined Mole and Rat Trap; and I do hereby declare the following to be a full, clear, and exact description of the invention, such as will enable others skilled in the art to which it appertains to make and use the same.

This invention relates generally to traps, and particularly to the class of traps known as "choke-traps."

The trap embodied in my invention is also adapted for catching either rats or moles.

The object of the invention, therefore, is to provide a trap which can easily be arranged for catching either rats or moles entering the trap at either end.

Another object is to provide a novel form of locking and tripping mechanism, and a still further object is to provide a bearing-frame and guide for the choking-bail.

With these objects in view, my invention consists essentially of a board carrying a pair of spring-actuated choking-bails and a box to which said board is attached, said board being secured to the box when used for catching rats, and detached from the box and secured to the ground when set for moles.

The invention consists also in having two overlapping locking-rods and a single trip-lever for holding or releasing both rods at once; and my invention consists also in having a bearing-frame composed of guide-bails for each choke-bail, the bottom member of said bails being used to press the rat or mole against.

My invention consists also in certain details of construction of parts, all of which will be fully described, and pointed out in the claims.

Figure 1:
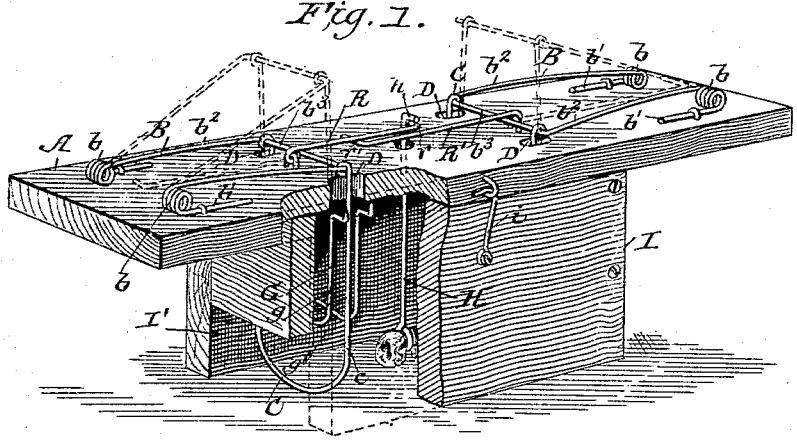
Figure 2:
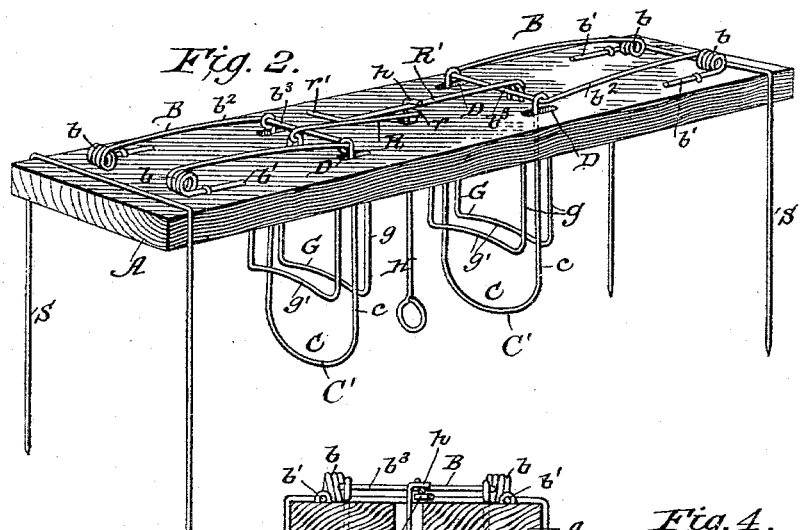
Figure 3:
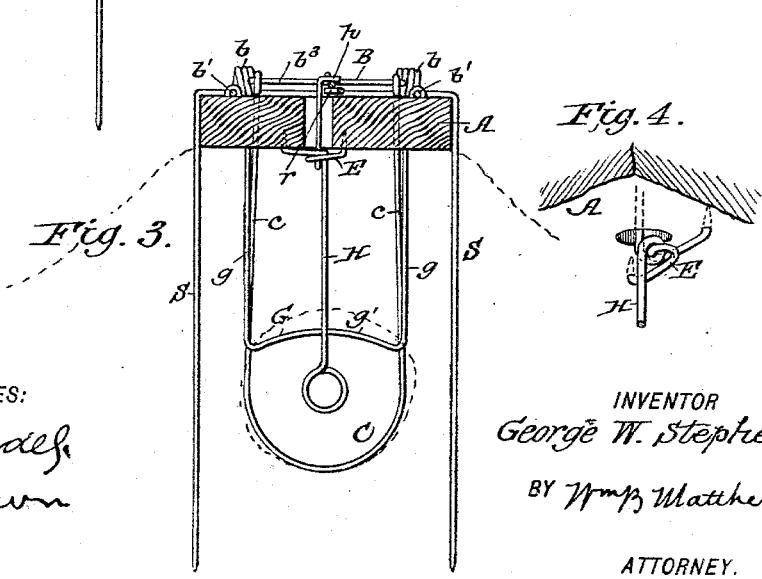
Figure 4:
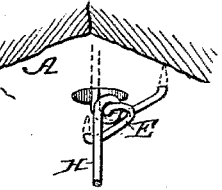

In the drawings forming a part of the specification, Figure 1 is a perspective view showing trap set for catching rats, the side being broken away and the trap shown "sprung" in dotted lines. Fig. 2 is a similar view showing the trap arranged for catching moles. Fig. 3 is a transverse vertical section, and Fig. 4 is a detail view showing the pivot of the bait-hook.

In the practical embodiment of my invention I employ a flat piece of board A, rectangular in shape and any suitable size. Near each end of the board is secured a spring-bail B, having coils $b\ b$, ends $b'\ b'$, secured to the board by staples, side members $b^2\ b^2$, and the cross member $b^3$. Choke-bails C C are connected to the spring-bails above the board, the upper ends of the choke-bails passing through openings D D, formed in the board, and are connected to the cross member $b^3$ of the spring-bail. The choke-bails C are essentially rectangular in shape and comprise the vertical members $c\ c$ and horizontal choke-piece $c'$, said choke-piece being slightly curved, as clearly shown in Fig. 3.

Depending from the under side of the board A is the bearing-frame composed of the parallel guide-bails G, one on each side of each choke-bail, essentially rectangular in shape also, and comprising the vertical members $g\ g$ and horizontal members $g'$, against which the animal is pressed by the choke-bail, and it will be noticed that the lower members of the bearing-frame or guide-bails are curved in a direction opposite to the curve of the choke-bail in order to render the grip sure and the action positive. It will thus be seen that the bails G G guide the choke-bails and also provide the bearing-pieces against which the animal is pressed.

In order to "set" and "spring" the trap, I provide two locking-rods R and R', having oppositely-hooked ends $r$ and $r'$, respectively, and the rod R is made somewhat shorter than the rod R'. A hole E is made in the center of the board A, and pivoted within said hole, so as to have a free movement in every direction, is a combined bait-hook and catch H, the upper end having a catch-hook $h$ to engage the lock-rods R and R', while the lower end is shaped to receive a bait of any description.

When the trap is used for catching moles, I place it flat upon the ground, cutting holes in the ground for the guide and choke bails, and secure the board to the earth by means of large wire staples S S, one at each end of the board.

When the trap is used for catching rats, I arrange the board upon the box I and secure the same by means of hooks and staples $i$. The box has entrances I' I' at each end to allow the rat to enter and take the bait.

Now in operation the hook is baited and the spring-bails pressed down, throwing the choke-bails down, so that the choke-pieces rest upon the bottom of box or the bottom of the mole-passage. The bails are then locked in this position by turning the rods R and R' over the cross members $b^3 b^3$, and holding said rods down by means of the hooked catch $h$ of the combined bait-hook and catch. Either rod can be made to engage the catch, and in Fig. 1 I have shown the end $r$ and in Fig. 2 the arm $r'$ in engagement. The moment the animal attempts to take the bait the catch is rocked, releasing the rods, and the springs immediately throw the choke-bail up and catch the animal between said bail and the lower members of the bearing-frame.

It will thus be seen that the trap can be used for catching moles or rats, and also that it will operate when the animal enters from either end, inasmuch as there is a choke-bail at each end and both operated by a single bait-hook.

Having thus described my invention, what I claim is—

1. In a trap, the combination with the board of a spring bail arranged upon the upper side of the board, a choke bail suspended from the free end of the spring bail, the guide bails arranged on opposite sides of the choke bail and having bearing members as set forth, and means for setting and releasing the choke bail, substantially as shown and described.

2. In a trap, the combination with the board and box, the latter secured to the under side of said board, of spring and choke bails, the former arranged upon and the latter passing through the board and extending down into the box, the combined guide and bearing frames and means for setting and releasing the choke bail, substantially as shown and described.

3. In a trap, the combination with a board substantially as shown, of the spring bail and choke bail at each end of said board, the former arranged upon and the latter extending down through the board, the combined guide and bearing frame on opposite sides of the choke bail, the locking rods upon the board adapted to overlap and hold down the spring bails, and a single bait hook extending down from the under side of the board and having at its upper end a catch adapted to engage the locking rods, substantially as shown and described.

4. In a trap, the combination with the board, of a spring bail secured to the upper side thereof and having suspended from its free end a choke bail extending down through said board and having its lower member slightly curved, the bearing frames on the under side of the board and arranged on opposite sides of the choke bail, and having their lower member curved, substantially as shown and for the purpose set forth.

In testimony whereof I affix my signature in presence of two witnesses.

GEORGE WASHINGTON STEPHENS.

Witnesses:
W. M. WEATHERS,
BONNIE AUBREY.